United States Patent [19]

Mamin et al.

[11] Patent Number: 6,055,220
[45] Date of Patent: Apr. 25, 2000

[54] OPTICAL DISK DATA STORAGE SYSTEM WITH IMPROVED SOLID IMMERSION LENS

[75] Inventors: Harry Jonathon Mamin, Palo Alto; Daniel Rugar, Los Altos; Bruce David Terris, Sunnyvale, all of Calif.

[73] Assignee: International Business Machines Corporation, Armonk, N.Y.

[21] Appl. No.: 09/052,910

[22] Filed: Mar. 31, 1998

[51] Int. Cl.$^7$ ........................................ G11B 7/00
[52] U.S. Cl. ............................ 369/112; 369/118
[58] Field of Search ............................ 369/44.23, 44.24, 369/109, 110, 112, 116, 117, 118, 121

[56] References Cited

U.S. PATENT DOCUMENTS

| | | | |
|---|---|---|---|
| 5,004,307 | 4/1991 | Kino et al. | 350/1.2 |
| 5,125,750 | 6/1992 | Corle et al. | 359/819 |
| 5,272,330 | 12/1993 | Betzig et al. | 250/216 |
| 5,497,359 | 3/1996 | Mamin et al. | 369/44.15 |
| 5,602,820 | 2/1997 | Wickramasinghe et al. | 369/126 |
| 5,689,480 | 11/1997 | Kino | 369/14 |
| 5,729,393 | 3/1998 | Lee et al. | 359/819 |

OTHER PUBLICATIONS

E. Betzig et al., "Near–field Magneto–optics and High Density Data Storage", *Applied Physics Letters*, vol. 61, No. 2, Jul. 13, 1992, pp. 142–144.

F. Zenhausern et al., "Scanning Interferometric Apertureless Microscopy: Optical Imaging at 10 Angstrom Resolution", *Science*, vol. 269, Aug. 25, 1995, pp. 1083–1085.

*Primary Examiner*—Paul W. Huber
*Attorney, Agent, or Firm*—Thomas R. Berthold

[57] ABSTRACT

An optical disk drive uses an air-bearing slider that supports a solid immersion lens (SIL) with a patterned thin film formed at the focus of the SIL to act as a secondary radiation source. The thin film is patterned to define either an "aperture" or a "scatterer", both of which localize the interaction of the disk drive's incident light beam with the underlying optical disk to create an effectively smaller light spot. In one embodiment the patterned thin film is opaque with a small aperture having a diameter less than the wavelength of the incident light beam. The aperture localizes the transmission of the incident light beam to the area of the aperture and generates an evanescent field that interacts with the optical disk. In a second embodiment, the patterned thin film is metallic and formed as dot that serves as a scatterer. The scatterer acts as an antenna or secondary light source to locally reradiate a portion of the incident light beam to the optical disk. Both approaches result in disk drive that has a smaller effective light spot than would be obtained if the SIL were used alone, provided that the optical disk is placed within sub-wavelength proximity of the aperture or scatterer.

22 Claims, 9 Drawing Sheets

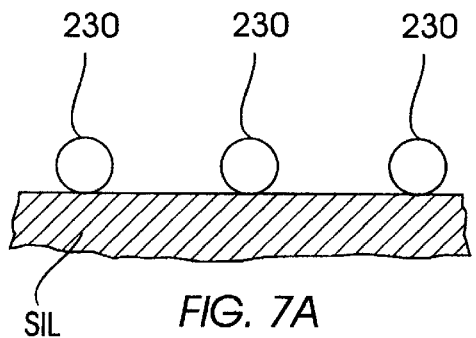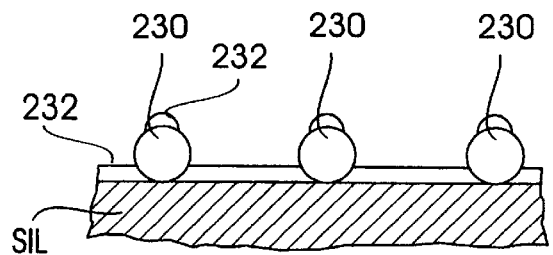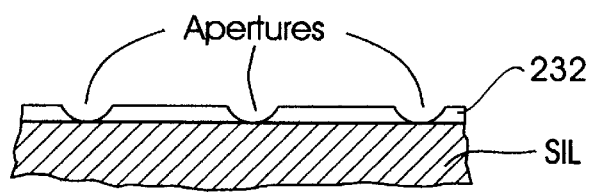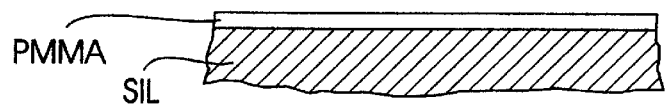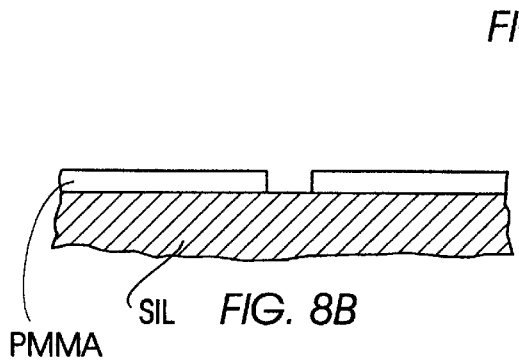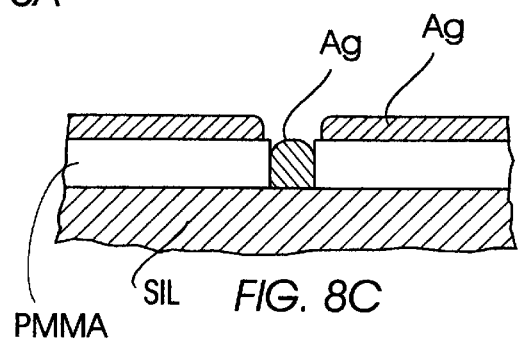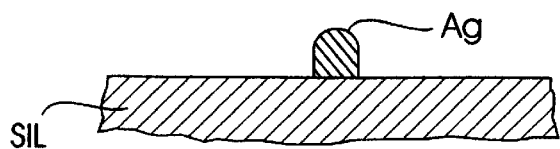

OPTICAL DISK DATA STORAGE SYSTEM WITH IMPROVED SOLID IMMERSION LENS

TECHNICAL FIELD

This invention relates generally to optical disk data storage systems of the type that use a solid immersion lens to reduce the size of the light beam at the data layer on the disk.

BACKGROUND OF THE INVENTION

Optical disk data storage systems provide the capability to store large quantities of data on a disk. The data is accessed by focusing a laser beam onto the data layer of the disk and then detecting the reflected light beam. Various kinds of systems are known. In a ROM (Read Only Memory) system, such as a compact disk system (CD-ROM), data is permanently embedded as marks in the disk at the time of manufacture of the disk. The data is detected as a change in reflectivity as the laser beam passes over the data marks. A WORM (Write-Once Read-Many) system allows the user to write data by making marks, such as pits, on a blank optical disk surface. Once the data is recorded onto the disk, it cannot be erased. The data in a WORM system is also detected as a change in reflectivity. There are also erasable optical data storage systems, such as phase-change and magneto-optic (M-O) systems. While phase-change systems also read data by sensing a change in reflectivity, M-O systems read data by measuring the rotation of the incident polarization caused by the M-O media. In all of these systems, the focusing lens for the optical beam is located away from the disk.

The data density in optical disk drives is determined by the size of the recorded marks or pits on the disk, which is limited by the diameter of the focused laser spot on the disk. This spot size is the same as the diameter of the focused optical beam, also called the beam waist size. The waist size of a focused light beam is given approximately by $\lambda/2NA$, where $\lambda$ is the wavelength and NA is the numerical aperture of the lens. The waist size can be reduced by either using shorter wavelength lasers, such as blue lasers, or by employing higher NA lenses.

Another way to reduce the spot size is through near-field optics, in which a physical aperture is formed which allows light to be transmitted only through the aperture. The optical spot size is determined by the physical dimensions of the aperture, provided operation is in the near-field regime, i.e., closer to the aperture than a fraction of a wavelength. Typically, near-field optics is done by using a tapered optical fiber with metallization on the sides. Since the aperture dimensions can be much less than a wavelength, much smaller spots and therefore higher areal densities can be achieved. A near-field scanning optical microscope (NSOM) has recorded in M-O films at densities of 45 GB/in$^2$, corresponding to a bit size of about 0.12 $\mu$m, as described by Betzig et al., "Near-field magneto-optics and high density data storage", Appl. Phys. Lett 61(2), Jul. 13, 1992, pp.142–144. In imaging modes, resolution down to 200 Å has been obtained. One problem with NSOM is its poor optical efficiency. Only $10^{-6}$–$10^{-3}$ of the light coupled into the fiber makes it out the end. In addition, the collection efficiency in reflection is so poor that the NSOM approach is used only in transmission.

The solid immersion lens (SIL) reduces the spot size by using a high NA lens made of high index of refraction (n) material. A SIL, which is made in the shape of a hemisphere, is described by S.M. Mansfield et al., Optics Letters, Vol. 18, 1993, page 305. The use of a hemispherical SIL for an optical microscope has been described in U.S. Pat. No. 5,004,307, where the spherical surface of the SIL faces an objective lens for receipt of the laser light and the planar surface of the SIL passes through the geometrical center of the spherical surface. As shown in FIG. 1A, a hemispherical SIL has a thickness r, where r is the radius of the sphere. The NA is increased by a factor of n due to the wavelength reduction in the lens. U.S. Pat. No. 5,125,750 describes an optical disk drive with a conical section of a hemispherical SIL supported on a conventional air-bearing slider of the type used in magnetic recording disk drives. The conical section of the hemispherical SIL is held within the slider by springs so that the flat surface of the SIL faces the disk surface.

Another type of SIL, referred to as a "superhemispherical" SIL, is shown in FIG. 1B. This type of SIL includes a partial spherical section and has an overall lens thickness greater than the r thickness of a hemispherical SIL. The superhemispherical SIL has a thickness $r(1+1/n)$, where r is the radius of the partial spherical section. A focused spot will be obtained at the planar surface or base of the superhemispherical SIL when the incident rays are converging toward a point located a distance nr below the center of the sphere. The incoming converging rays are refracted at the surface of the partial spherical lens section, resulting in an increased effective incident angle $\theta$. In the superhemispherical SIL, the NA is increased by a factor of $n^2$, as compared with an increase by a factor of only n in the hemispherical SIL. IBM's U.S. Pat. No. 5,497,359 describes an optical disk data storage system wherein the lens section and body of the air-bearing slider are formed of the same material to thus have the same index of refraction and together form a superhemispherical SIL.

In both the hemispherical and superhemispherical SILs, the small spot exists only within the high index of refraction material because the high angle rays will be internally reflected at the base of the SIL. However, these rays can be coupled via their evanescent fields to the optical disk if the disk is placed less than a wavelength distance from the planar surface of the SIL. Thus, the SIL can be used to increase the storage capacity of an optical disk by the square of the spot size reduction, but only if the SIL can be kept much closer than one wavelength from the disk. The small spot can then be transmitted across a small air gap to the optical disk via evanescent coupling, within the near-field regime. With a red laser ($\lambda$=670 nm) and an index of n=2 for the SIL, a spot size of about 0.16–0.2 $\mu$m can be obtained. The SIL has excellent efficiency, of the order of 1, and can be operated in reflection, but cannot go to as small a spot size as can the NSOM.

Another approach to near field optical data storage is described in IBM's U.S. Pat. No. 5,602,820. In this approach a sharp tip is used as a localized "antenna" or scatterer of incident light such that the dipole-dipole coupling between the tip and a bit on the storage medium interact to change the amplitude and/or phase of the reflected light. Interferometry techniques are then used to sensitively detect this change of amplitude and/or phase. The optical efficiency of this technique depends strongly on the intensity of the optical beam impinging on the scatterer, leading to an efficiency proportional to $NA^2$, where NA is the numerical aperture of the lens that focuses incident light onto the sharp tip.

What is needed is an optical disk drive that takes full advantage of near-field optics and the benefits of high NA SILs to achieve a small spot size and thus an increased bit density.

SUMMARY OF THE INVENTION

The present invention is an optical disk drive with an air-bearing slider supporting a SIL and with a patterned thin film formed on the slider at the focus of the SIL to act as a secondary radiation source. The thin film is patterned to define either an "aperture" or a "scatterer", both of which localize the interaction of the disk drive's incident light beam with the underlying optical disk to create an effectively smaller light spot. In one embodiment the patterned thin film is opaque with a small aperture having a diameter less than the wavelength of the incident light beam. The aperture localizes the transmission of the incident light beam to the area of the aperture and generates an evanescent field that interacts with the optical disk. In a second embodiment, the patterned thin film is metallic and formed as dot that serves as a scatterer. The scatterer acts as an antenna or secondary light source to locally reradiate a portion of the incident light beam to the optical disk. Both approaches result in disk drive that has a smaller effective light spot than would be obtained if the SIL were used alone, provided that the optical disk is placed within sub-wavelength proximity of the aperture or scatterer.

For a fuller understanding of the nature and advantages of the present invention, reference should be made to the following detailed description taken in conjunction with the accompanying figures.

BRIEF DESCRIPTION OF THE DRAWING

FIGS. 7A–7C are illustrations of steps of an alternative process for forming a SIL with an aperture on the planar surface.

FIGS. 8A–8D are illustrations of process steps in forming a SIL with a scatterer on the planar surface.

DESCRIPTION OF THE PREFERRED EMBODIMENTS

Prior Art

Figure 1A:
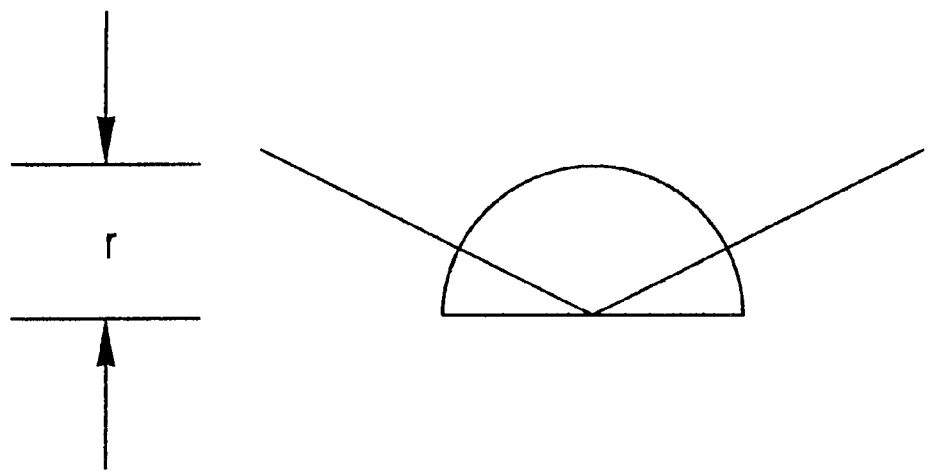
FIG. 1A is a diagram of a prior art hemisphere solid immersion lens (SIL) with a thickness r.
Figure 1B:
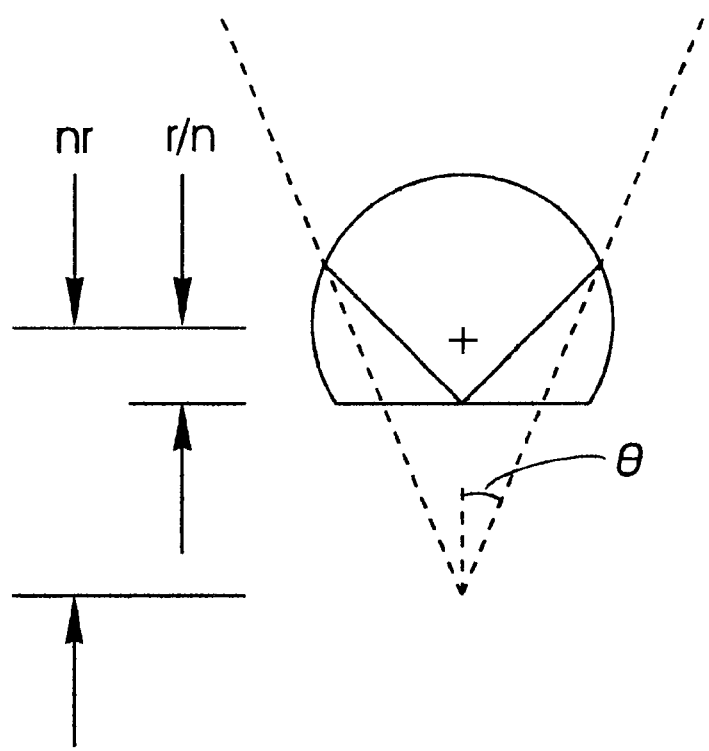
FIG. 1B is a diagram of a prior art superhemispherical SIL with a thickness r(1+1/n).
Figure 2:
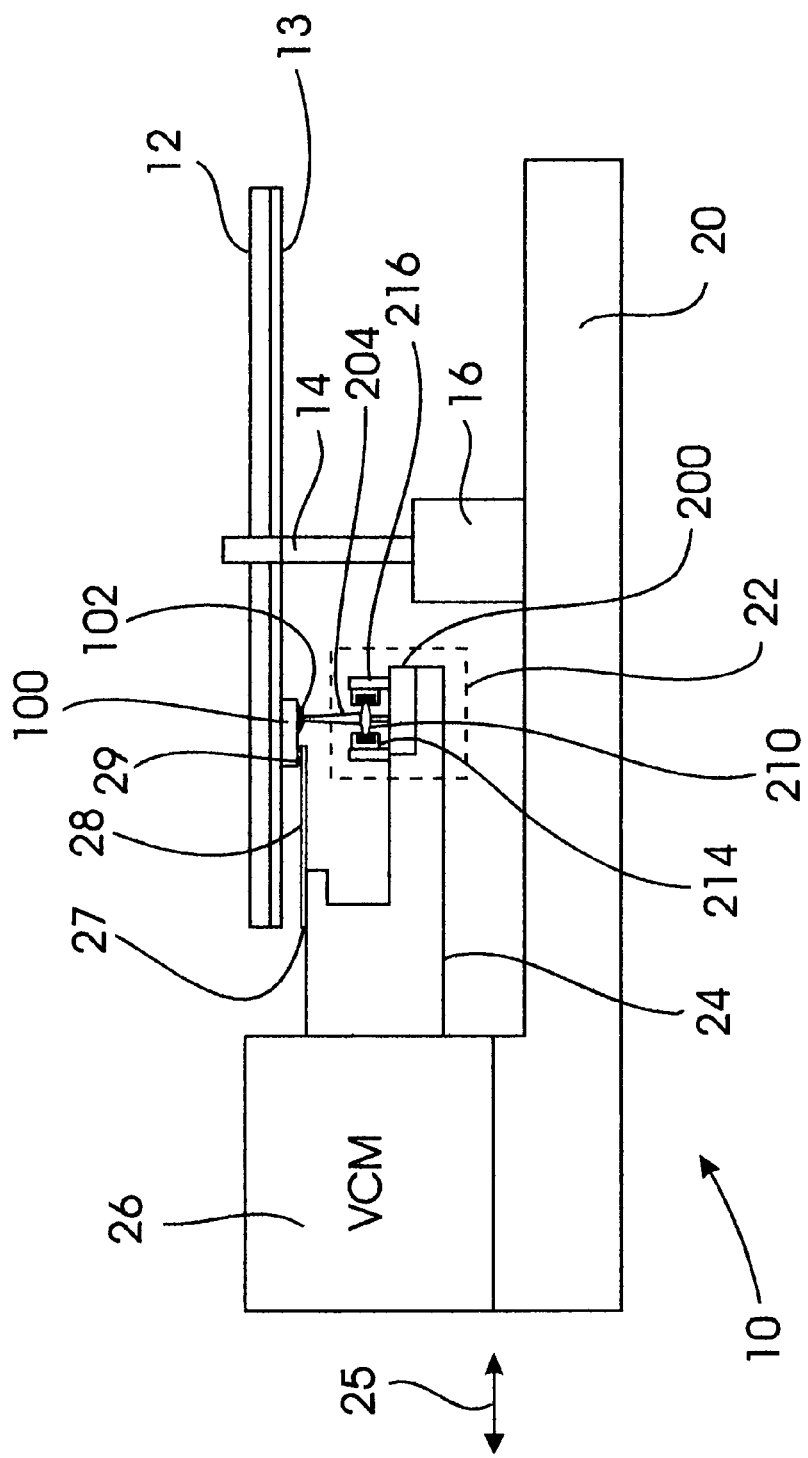
FIG. 2 is a schematic diagram of a prior art optical disk data storage system using a SIL supported on an air-bearing slider.

FIG. 2 shows a schematic diagram of an optical disk data storage system designated by the general reference number 10. System 10 includes an optical data storage disk 12 with an optical data layer 13. The disk 12 is preferably removably mounted on a clamping spindle 14, as is known in the art. Spindle 14 is attached to a spindle motor 16, which in turn is attached to a system chassis 20. Motor 16 rotates spindle 14 and disk 12. An optical head 22 is positioned below disk 12. Head 22 is attached to an arm 24, which in turn is connected to an actuator device, such as a voice coil motor (VCM) 26. VCM 26 is attached to chassis 20 and moves arm 24 and head 22 in a radial direction below disk 12.

An air-bearing slider 100 with a hemispherical SIL 102 mounted on it is also attached to the actuator arm 24 that also supports optical head 22. The attachment of the slider 100 to arm 24 is by means of a conventional suspension 27, such as that used in rigid magnetic recording disk drives. One such suspension is the well-known Watrous suspension, as described in IBM's U.S. Pat. No. 4,167,765. This suspension includes a load beam 28 with a flexure 29 attached to its end. The slider is attached to the flexure by an epoxy adhesive. The flexure and load beam permit the air-bearing slider to pitch and roll as it rides on the air bearing caused by the rotating disk and the air-bearing surface of the slider 100.

The VCM 26 moves the actuator arm 24 in a linear direction (depicted by arrow 25) so that air-bearing slider 100 and optical head 22 move in unison in a radial direction across the surface of optical disk 12. The optical head 22 includes a laser 200, a focus lens 210 supported in lens holder 214, and a focus actuator 216 for moving the lens 210 in a direction generally perpendicular to disk 12. In this manner, the converging beam 204 can be focused through the SIL 102 onto the data layer 13 of the optical disk 12.

Figure 3:
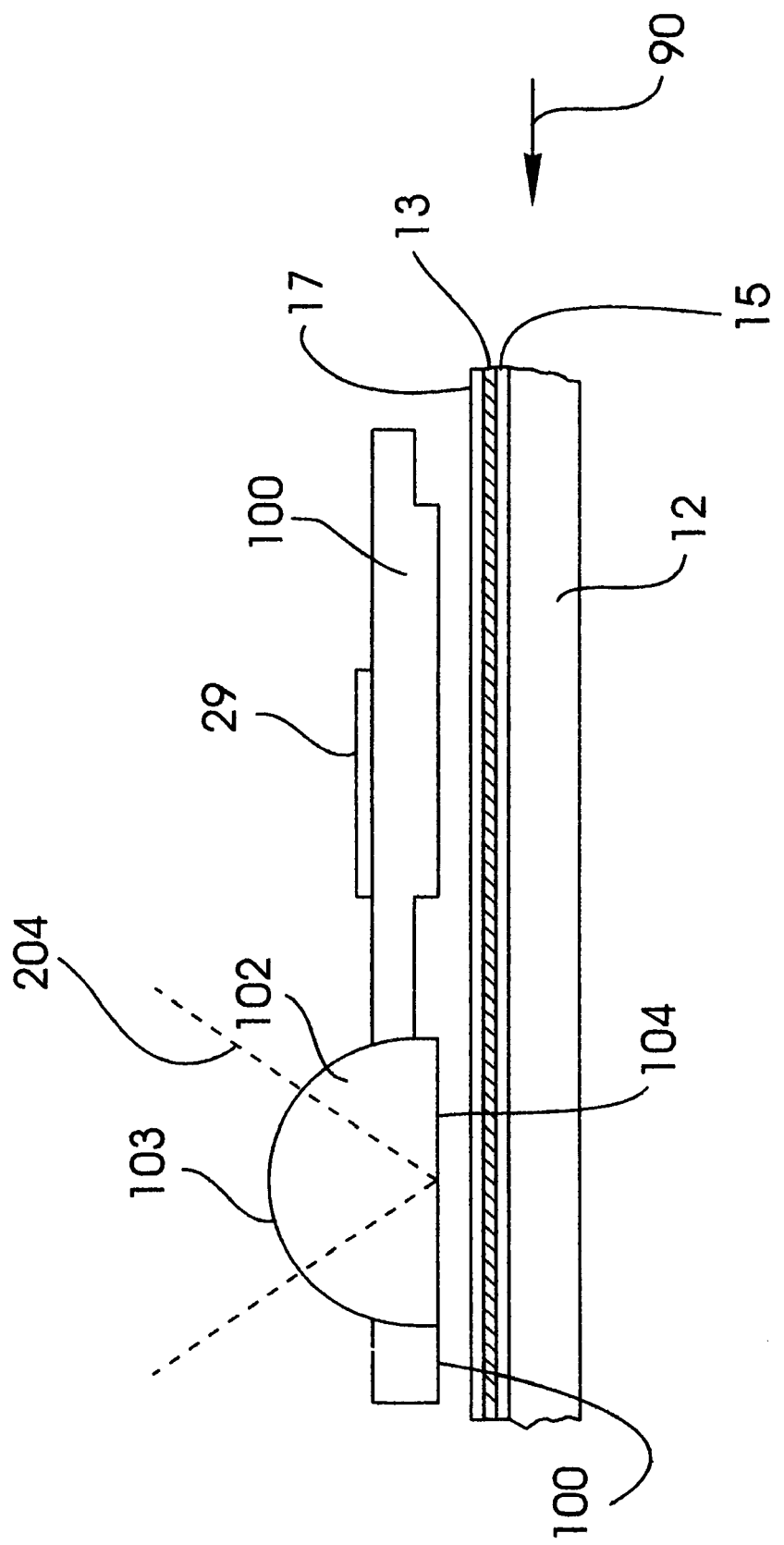
FIG. 3 is a side view illustrating a prior art air-bearing slider with a hemispherical SIL mounted in an air-bearing relationship with an optical disk.

Referring now to FIG. 3, the prior art slider 100 is shown in side view in its air-bearing relationship with the surface of disk 12. The arrow 90 represents the direction of motion of disk 12 relative to slider 100. The disk 12 is represented as a conventional M-O disk. The M-O disk 12 has a smooth glass substrate onto which is formed a first dielectric layer 15, such as silicon nitride (SiN), a rare earth transition metal (RE-TM) data layer 13, and a second protective dielectric capping layer 17, which may also be SiN. Alternatively, the data layer 13 can be a cobalt-platinum multilayer and the capping layer 17 can be carbon. The capping layer 17 typically has a relatively high index of refraction, i.e., approximately 2.3 for SiN, and a thickness in the range of 10–100 nm. The hemispherical SIL 102 is mounted within slider 100 and has its spherical surface 103 facing light beam 204 and its planar base surface 104 facing disk 12. The slider 100 is mounted by an adhesive to the stainless steel flexure 29 that forms part of the suspension 27 that attaches slider 100 to actuator arm 24.

Figure 4:
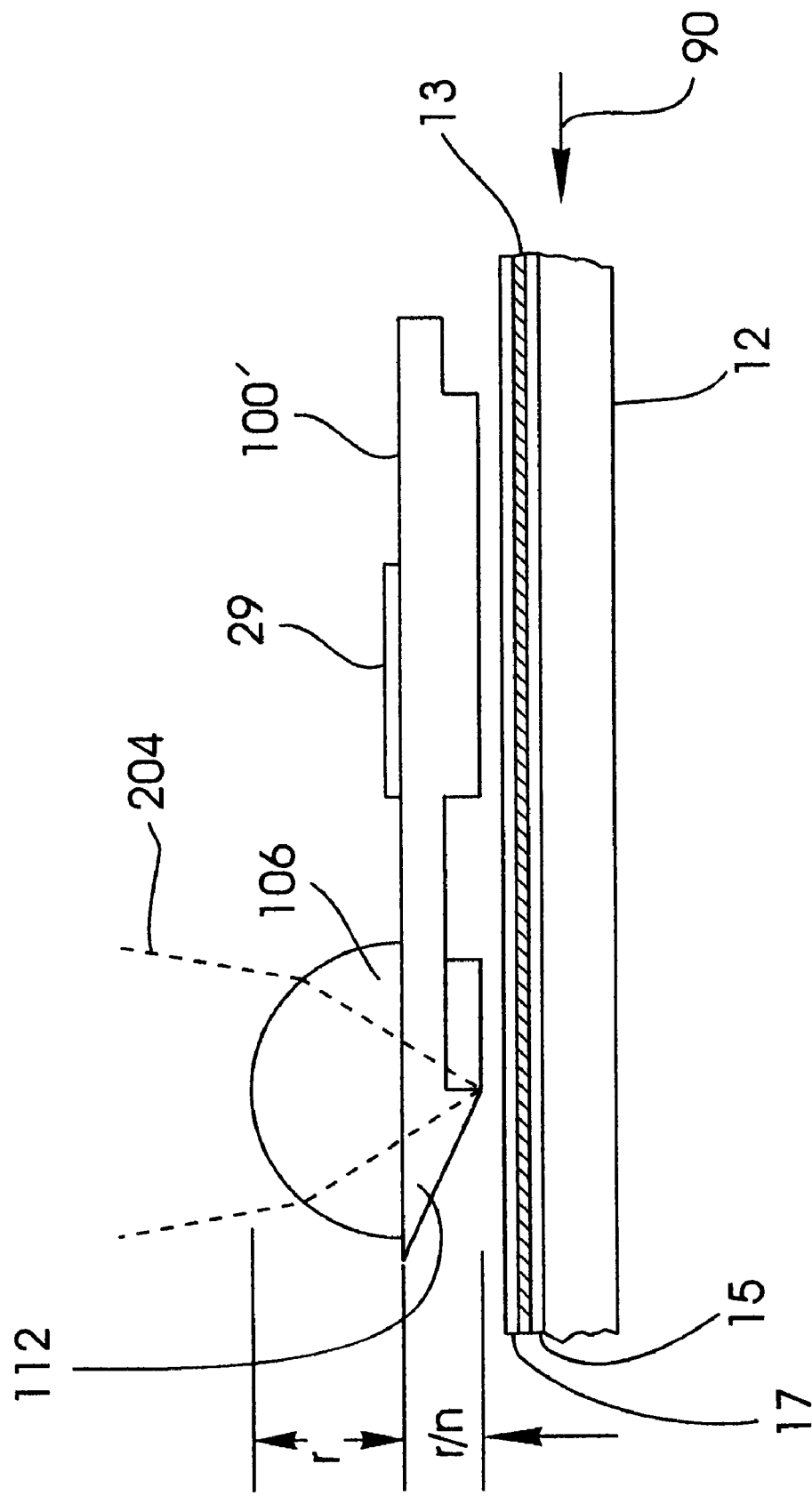
FIG. 4 is a side view illustrating a prior art air-bearing slider with a superhemispherical SIL mounted in an air-bearing relationship with an optical disk.

In FIG. 4, the prior art slider of the type described in the previously-cited '359 patent with a superhemispherical SIL 106 is shown in its air-bearing relationship with disk 12. The SIL of FIG. 4 uses a portion of the transparent body of slider 100'. This portion 112 has a thickness r/n.

Preferred Embodiments

In the present invention, a patterned metallic thin film located at the focus of the SIL as either an "aperture" or a "scatterer" is used to localize the interaction of an incident optical beam with the underlying sample (e.g., storage medium) so as to create an effectively smaller spot size. In one embodiment the patterned metallic thin film forms a small aperture 204, shown in FIG. 5A. In this case the metallic film is made thick enough so as to be opaque to the incident light except in the area of the aperture. The aperture serves to localize the transmission of the incident light to the area of the aperture, which can have sub-wavelength dimensions. In a second embodiment, the patterned metallic thin film is in the form of a sub-wavelength-size metallic dot or scatterer 210, shown in FIG. 5B, which acts as an antenna to locally reradiate a portion of the incident optical energy. Both approaches result in a smaller effective optical spot size than would be obtained if the SIL were used alone, provided that the sample (e.g., storage medium) is placed within sub-wavelength proximity of the the aperture or scatterer. The improved SIL combines the high optical efficiency of the SIL with the high spatial resolution that can be obtained with the aperture or scatterer, and is fully compatible with air bearing slider configurations. Thus, in the present invention, both the aperture and the scatterer function as sub-wavelength radiation secondary "sources" formed on the air-bearing surface of a slider incorporating a SIL. The improved optical efficiency that can be obtained by combining the SIL with the aperture or scatterer according to the present invention can be understood from the following detailed description of the two embodiments.

Figure 5A:
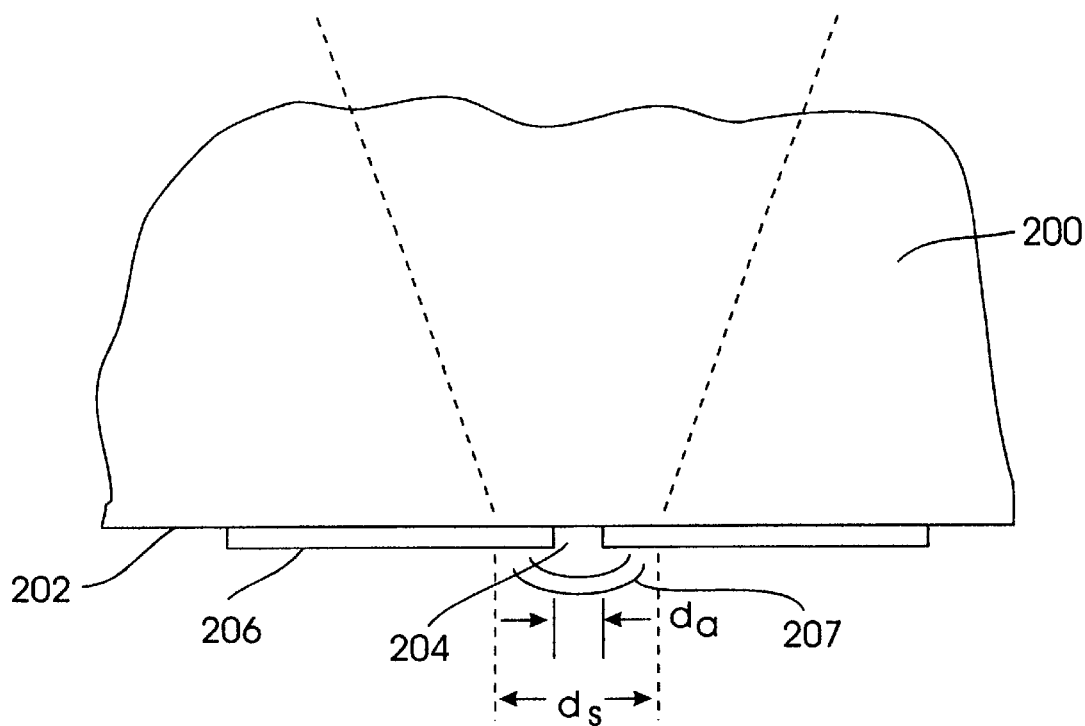
FIG. 5A is a side sectional view of a slider of the present invention with the improved SIL having a patterned film defining an aperture.

Referring first to FIG. 5A, assume the aperture 204 of SIL 200 is $d_a$ in diameter. The aperture 204 is defined by a film 206 of opaque material, e.g., aluminum, formed on the planar surface 202 of SIL 200. If the diameter of the radiation beam spot impinging on the aperture is $d_s$, then the efficiency will be roughly $(d_a/d_s)^2$. If $d_a$=200 Å and $d_s$=0.7 $\mu$m, corresponding to $\lambda$=680 nm and NA=0.5, then the efficiency would be $8\times10^{-4}$ if there were no SIL. Now suppose that $d_s$ is decreased to 0.2 $\mu$m with the aid of the SIL 200 operating with NA=1.75. The efficiency increases to $10^{-2}$, a 12-fold improvement. If laser shot noise is the factor limiting the bandwidth of the readback signal, as is usually the case with near-field optics, then the increased signal from the improved SIL means that the bandwidth can be effectively increased by more than 100 times. This argument underestimates, if anything, the effect of increasing the ratio $(d_a/d_s)$. In any case, the smaller the initial spot impinging on the aperture 204, the less light is lost going through the aperture. The aperture 204 shown in FIG. 5A gives rise to an evanescent field shown by the spherical wavefronts 207 below the aperture.

Figure 5B:
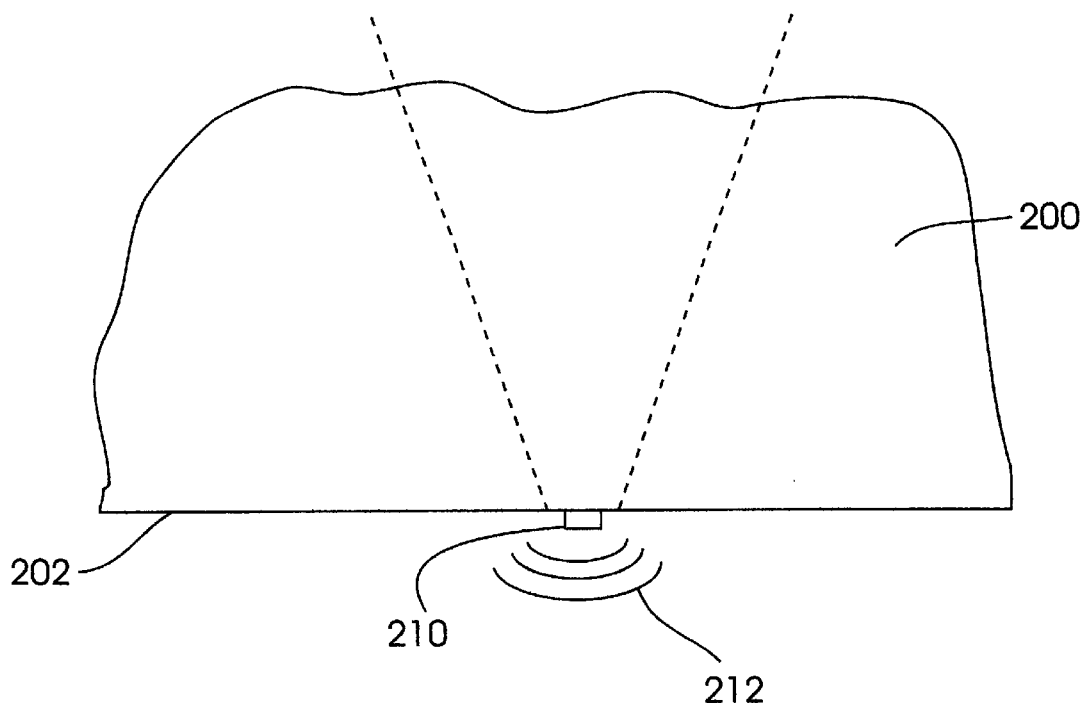
FIG. 5B is a side sectional view of a slider of the present invention with the improved SIL having a patterned film defining a scatterer.

An analogous situation is shown in FIG. 5B for the embodiment where the film on the planar surface 202 of SIL 200 forms a scatterer 210. Here scatterer 210 is a metallic generally spherically-shaped particle or circular dot on planar surface 202. The shape of the scatterer is not critical, provided one dimension is less than the wavelength of the radiation used in the optical disk drive. Thus the scatterer could be a generally disk-shaped dot with a sub-wavelength dimension in the plane of planar surface 202. The use of a small scatterer in the near-field regime is described by IBM's U.S. Pat. No. 5,602,820 where a conventional lens is used to focus light onto a sharp tip which, in turn, reradiates a weak spherical wavefront that interacts with the sample via dipole—dipole coupling. According to equation (13) of the '820 patent, the response of the optical system that picks up the interaction between the sharp tip and the sample is proportional to $NA^2$ since the dipole—dipole coupling effect is proportional to the intensity of the incident focused optical beam. While the '820 patent describes a sharp tip as the scatterer, the analysis is the same if the scatterer is a dot or small generally spherically-shaped particle, as described with respect to FIG. 5B. The increased NA that can be obtained with the SIL according to the present invention allows greater efficiency to be achieved.

Alternative non-circular shapes are also possible for either the aperture or the scatterer. For example, they can have a generally elliptical or rectangular shape to allow for various bit aspect ratios on the optical medium.

Figure 6B:
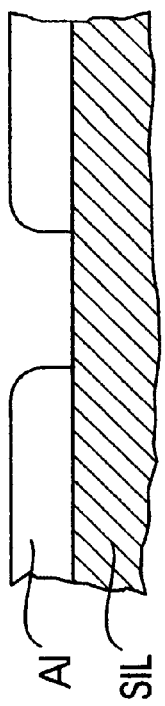
FIGS. 6A–6B are illustrations of process steps in forming a SIL with an aperture on the planar surface.
Figure 6A:
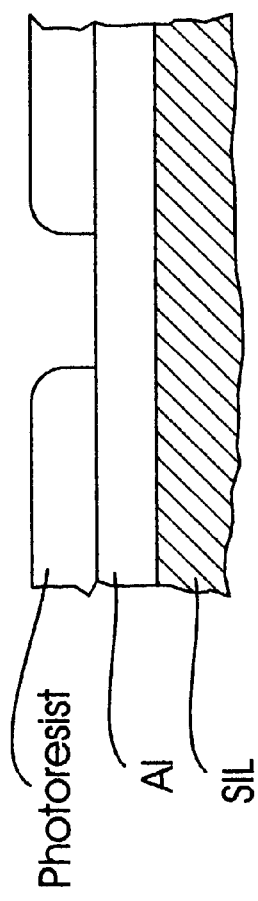

To define the aperture 204 in the embodiment of FIG. 5A, an opaque coating is formed on the underside of the SIL, and then an opening is formed in the coating, as shown by FIGS. 6A–6B. The aperture technique of the present invention can be used on hemisphere or superhemisphere SILs, transparent sliders, or a SIL embedded into a slider. An opaque film, such as 500–1000 Å of aluminum (Al), is deposited through standard evaporation techniques on the underside of the slider, followed by conventional photolithography to define an aperture in the photoresist, as shown in FIG. 6A. Then a wet or dry etch is performed to etch through the Al metallization in that region to form the aperture, after which the photoresist is removed, leaving the structure as shown in FIG. 6B. Using advanced photolithography, apertures down to at least 0.18 $\mu$m can be obtained. Smaller apertures can be obtained with electron beam lithography. Another method to form small apertures is with a focused ion beam (FIB) system. In this case, the process is straightforward. After deposition of the opaque metallization layer, the focused ion beam is used to remove the material in the desired region. Apertures as small as 200 Å in diameter can be formed in this way.

Another demonstrated technique to create apertures, which has the advantage of being inexpensive and simple, is illustrated in FIGS. 7A–7C. Polystyrene spheres 230 are first spread out over the lower surface of the SIL, as shown in FIG. 7A. These spheres are commercially available with a controlled radius of several hundreds of Angstroms. A metallization film 232, which may be formed of Al, is then deposited over the planar surface of the SIL and over the spheres, as shown in FIG. 7B. The structure is then placed in a suitable organic solvent, such as toluene, which dissolves the polystyrene spheres 230, leaving the apertures as shown in FIG. 7C. As long as the metallization film 232 thickness is less than the sphere radius, the metal will be completely removed in the region where the spheres were located, leaving small apertures. The density of the initial sphere placement can be such that the light in the SIL can be focused to only one aperture at a time. Alternatively, the spheres can be located in a pattern to form an array of apertures. By bringing in multiple light beams to the SIL and arranging each beam to focus to a different aperture in the array, parallel operation can be achieved, which is equivalent to having multiple optical heads on a single slider. This would be useful, for example, for increasing the data rate of the optical disk drive.

The same lithographic techniques described above for making the apertures can also be used to make the scatterer 210 in the embodiment of FIG. 5B, as shown by FIGS. 8A–8D. For example, a thin sacrificial resist, such as poylmethylmethacrylate (PMMA), is placed on the planar surface of the SIL, as shown in FIG. 8A. Optical, electron beam, or focused ion beam (FIB) lithography is then used to define a small opening in the resist, as shown in FIG. 8B. A thin metal layer, such as silver (Ag), is then evaporated onto the resist and onto the planar surface of the SIL in the region of the opening, as shown in FIG. 8C. Lift-off of the PMMA leaves just the small silver particle that serves as the scatterer, as shown in FIG. 8D.

Figure 9:
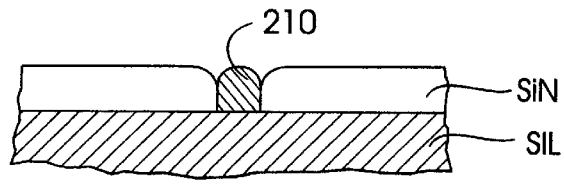
FIG. 9 is an illustration of a SIL with a scatterer and a protective coating on the SIL planar surface in the region not covered by the scatterer.
Figure 10A:
FIGS. 10A–10F are illustrations of process steps in forming the SIL shown in FIG. 9.
Figure 10B:
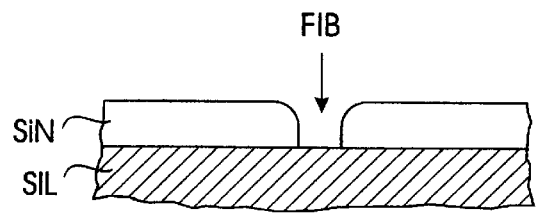
Figure 10C:
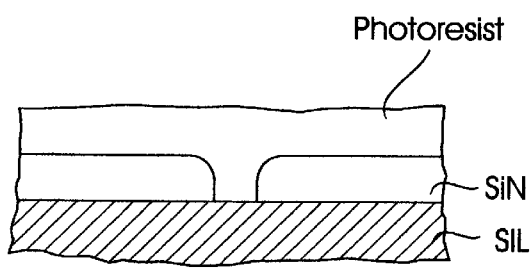
Figure 10D:
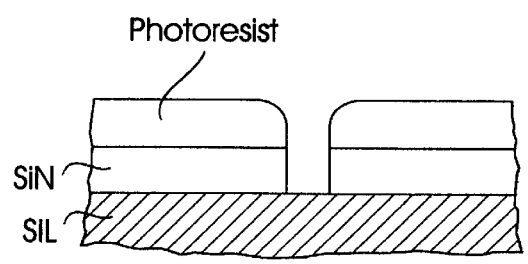
Figure 10E:
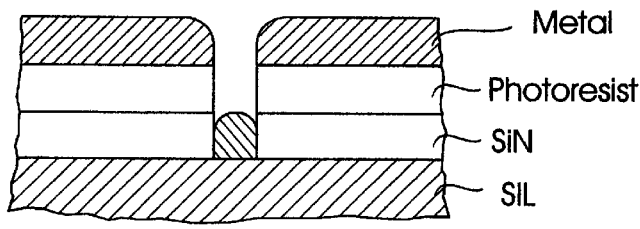
Figure 10F:
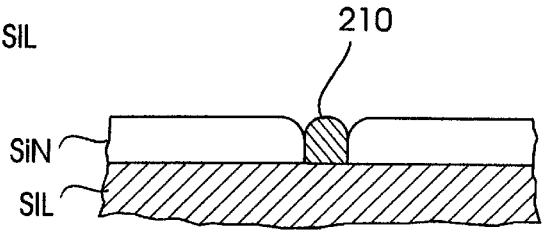

To protect the air-bearing surface of the SIL, the film that forms the aperture can be a hard protective coating, such as SiN or hard carbon. Since in the embodiment where the sub-wavelength radiation source is the aperture, the film that defines the aperture is opaque to the incident light. Thus the optical properties of such opaque films are irrelevant to the optical performance of the SIL. In the embodiment where the sub-wavelength radiation source is the scatterer, it is possible that a hard material can be used on the portion of the planar surface of the SIL that is not covered with the opaque metal film. In FIG. 9, for example, the scatterer 210 is embedded in a layer of silicon nitride (SiN). The SiN protects the air-bearing surface of the SIL, as well as the scatterer 210. A self-explanatory sequence of steps to form the structure of FIG. 9 is shown in FIGS. 10A–10F.

Figure 11A:
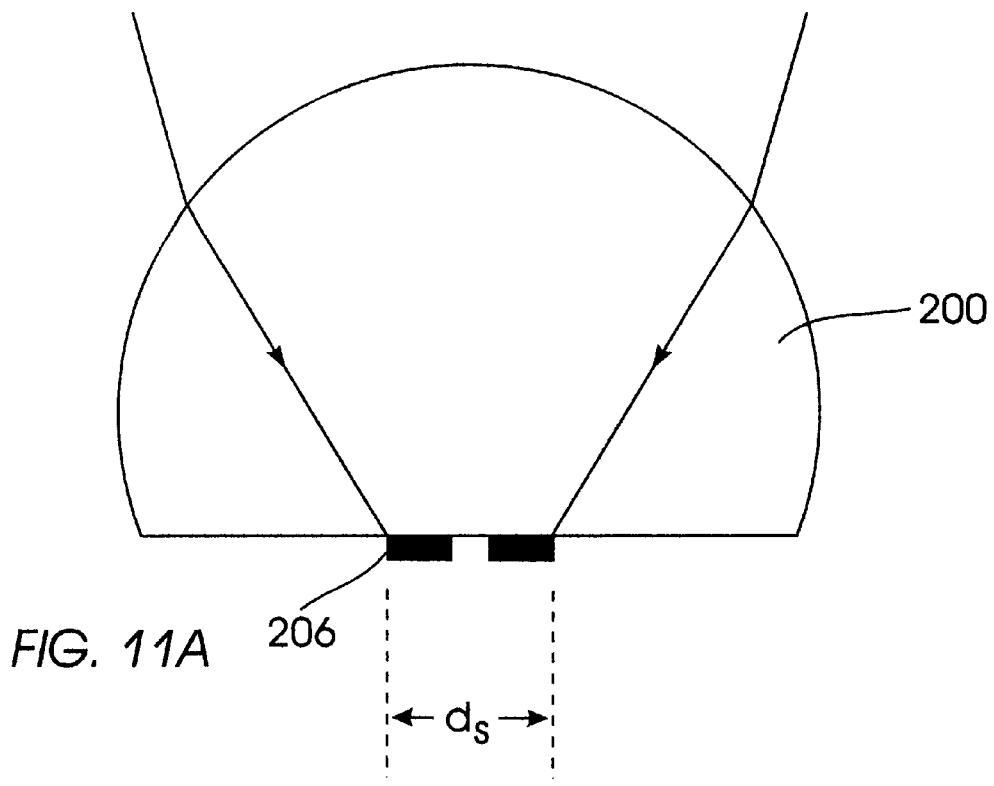
FIGS. 11A–11B are side and bottom views of a SIL with an opaque film with an aperture on the planar surface patterned to have a circular shape matching the spot size formed on the planar surface.
Figure 11B:
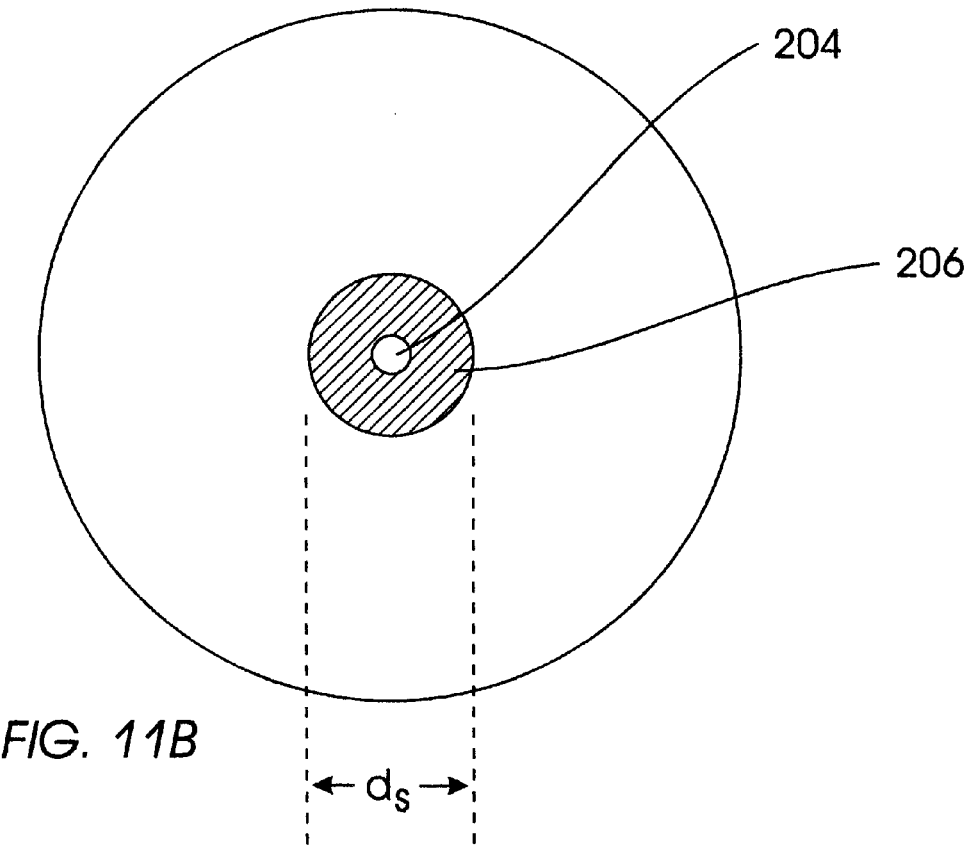

In both of the embodiments of the present invention, the focused spot on the planar surface of the SIL must be aligned on the aperture or scatterer. In the Z-direction, i.e., perpendicular to the disk surface, a conventional focus-error servo can be used. In the lateral direction, i.e., in the plane of the SIL's planar surface, the signal from the amount of light reflected off the planar surface can be used. For example, the metallization layer can be patterned as shown in FIGS. 11A–11B. The metallization is patterned to have approximately the same diameter $d_s$ as the focused spot size, with aperture 204 in the center. When the focused spot is centered on the aperture 204, the reflected light is at a maximum. As the focused spot moves off-center, some of the light spills off the circular metallization pattern 206, and the reflected light decreases. The signal from this reflected light can be used to align the spot on the aperture initially, and periodic realignment can be done as necessary.

For the case where the storage medium is magneto-optical, it is known to include a magnetic coil in the fabrication of the slider. In this way, the coil is very close to the media, and thus can be quite small while still generating sufficient magnetic field, as in conventional magnetic recording. By making the coil small, it can be switched very quickly. In this way, direct magnetic overwrite can be performed. The focused spot from the SIL is turned on in a quasi-CW manner, while the magnetic field is varied quickly to perform the writing. This allows for direct overwrite of previously-written material. In contrast, optical writing is normally done by pulsing the laser with the magnetic field on in one polarity, but this requires a previous pass to erase.

While the preferred embodiments of the present invention have been illustrated in detail, it should be apparent that modifications and improvements may be made to the invention without departing from the spirit and scope of the invention as described in the following claims.

What is claimed is:

1. A slider assembly for use in an optical disk drive where a radiation beam having a known wavelength is used, the assembly comprising:

a slider having an air-bearing surface;

a solid immersion lens supported on the slider and having a planar surface generally parallel to the air-bearing surface; and patterned material formed on the planar surface of the solid immersion lens and defining a radiation source having a dimension in the plane of said planar surface less than said radiation beam wavelength.

2. The assembly according to claim 1 wherein the solid immersion lens is a hemisphere.

3. The assembly according to claim 1 wherein the solid immersion lens is a superhemisphere.

4. The assembly according to claim 1 wherein the patterned material is a film substantially opaque to the radiation beam and having an aperture for passing radiation directed through the solid immersion lens through said planar surface.

5. The assembly according to claim 4 wherein the film of opaque material has a generally circular shape with the aperture being located substantially at the center of the circularly-shaped film.

6. The assembly according to claim 5 wherein the diameter of the circularly-shaped film is substantially the same as the diameter of the spot of radiation reaching the planar surface of the solid immersion lens when radiation is transmitted through the solid immersion lens to the planar surface.

7. The assembly according to claim 1 wherein the patterned material forms a scatterer for radiation directed through the solid immersion lens to said planar surface.

8. The assembly according to claim 7 further comprising a protective coating formed on the planar surface of the solid immersion lens in the region not covered by the scatterer.

9. The assembly according to claim 1 wherein the patterned material defines an array of said radiation sources.

10. The assembly according to claim 1 further comprising a magnetic coil formed on the slider.

11. An optical data storage system comprising:

an optical disk having a data layer;

a motor for rotating the disk;

a laser for generating a light beam at a predetermined wavelength;

a solid immersion lens having a generally spherical surface for receipt of the light beam and a planar surface;

a carrier for supporting the solid immersion lens with the planar surface of the solid immersion lens facing the surface of the optical disk;

patterned material formed on the planar surface of the solid immersion lens and defining a sub-wavelength dimension secondary light source on the planar surface; and an actuator for moving the carrier generally radially across the disk.

12. The system according to claim 11 wherein the solid immersion lens is a hemisphere.

13. The system according to claim 11 wherein the solid immersion lens is a superhemisphere.

14. The system according to claim 11 wherein the patterned material is a film substantially opaque to the light beam and having an aperture for passing light directed through the solid immersion lens through said planar surface.

15. The system according to claim 14 wherein the aperture has a generally rectangular shape.

16. The system according to claim 14 wherein the film of opaque material has a generally circular shape with the aperture being located substantially at the center of the circularly-shaped film.

17. The system according to claim 16 wherein the diameter of the circularly-shaped film is substantially the same as the diameter of the spot of light reaching the planar surface of the solid immersion lens when light is transmitted through the solid immersion lens to the planar surface.

18. The system according to claim 11 wherein the patterned material forms a scatterer for light directed through the solid immersion lens to said planar surface.

19. The system according to claim 18 wherein the scatterer has a generally rectangular shape.

20. The system according to claim 18 further comprising a protective coating formed on the planar surface of the solid immersion lens in the region not covered by the scatterer.

21. The system according to claim 11 wherein the patterned material defines an array of said light sources.

22. The system according to claim 11 further comprising a magnetic coil formed on the slider.

* * * * *